(12) United States Patent
Chen

(10) Patent No.: US 6,385,236 B1
(45) Date of Patent: May 7, 2002

(54) METHOD AND CIRCUIT FOR TESTING DEVICES WITH SERIAL DATA LINKS

(75) Inventor: Dao-Long Chen, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/166,304

(22) Filed: Oct. 5, 1998

(51) Int. Cl.⁷ .............................................. H04B 17/00
(52) U.S. Cl. ....................... 375/224; 375/219; 375/221; 370/249
(58) Field of Search ................................ 375/211, 213, 375/214, 219, 221, 224, 225; 370/232, 224, 235, 241, 243, 246, 248, 249, 274, 293, 315, 492, 501; 714/703, 712, 713, 715, 716, 717, 720, 738, 742

(56) References Cited

U.S. PATENT DOCUMENTS

| | | | |
|---|---|---|---|
| 3,869,580 A | 3/1975 | Ragsdale ....................... 179/15 |
| 3,869,603 A | 3/1975 | Auspurg et al. ............. 235/153 |
| 4,580,274 A | 4/1986 | Debany, Jr. et al. .......... 375/10 |
| 5,099,480 A | 3/1992 | Murata ....................... 371/20.4 |
| 5,148,435 A | 9/1992 | Ray, Jr. et al. .............. 371/20.5 |
| 5,553,059 A | 9/1996 | Emerson et al. ............... 370/14 |
| 5,557,437 A | 9/1996 | Sakai et al. .................. 359/110 |
| 5,631,644 A | 5/1997 | Katata et al. .................. 341/67 |
| 5,703,479 A | 12/1997 | Wieczorek et al. ......... 324/73.1 |
| 5,838,900 A * | 11/1998 | Horvath et al. ................ 714/56 |
| 5,856,999 A * | 1/1999 | Robinson et al. ............ 375/221 |
| 5,875,210 A * | 2/1999 | Brief et al. ................... 375/211 |
| 5,883,907 A * | 3/1999 | Hoekstra ...................... 714/784 |
| 5,953,372 A * | 9/1999 | Virzi ............................ 375/224 |
| 5,956,370 A * | 9/1999 | Ducaroir et al. ............. 375/221 |
| 5,974,584 A * | 10/1999 | Hendrickson et al. ....... 714/800 |
| 6,052,362 A * | 4/2000 | Somer ......................... 370/246 |
| 6,173,423 B1 * | 1/2001 | Autechaud et al. .......... 714/703 |
| 6,215,817 B1 * | 4/2001 | Kimura ........................ 375/220 |
| 6,222,380 B1 * | 4/2001 | Gerowitz et al. .............. 326/38 |
| 6,321,361 B1 * | 11/2001 | Autechaud et al. .......... 714/807 |

* cited by examiner

Primary Examiner—Chi Pham
Assistant Examiner—Emmanuel Bayard
(74) Attorney, Agent, or Firm—Trexler, Bushnell, Giangiorgi, Blackstone & Marr, Ltd.

(57) ABSTRACT

A circuit and method for testing a transceiver. The circuit includes a bit pattern generator connected to the transceiver such that the bit pattern generator can communicate a serial data stream to a receiver portion of the transceiver. The circuit also includes a bit pattern checker connected to the transceiver such that a transmitter portion of the transceiver can communicate a serial data stream to the bit pattern checker. The transceiver is configured such that the receiver portion of the transceiver is communicatingly looped back to the transmitter portion of the transceiver such that a data stream can be communicated from the receiver portion of the transceiver to the transmitter portion of the transceiver. Desirably, a loopback circuit in connected to the transceiver and includes fixed bit pattern means for communicating at least one fixed bit pattern to the transmitter portion of the transceiver. The loopback circuit is configured such that the FIFO component receives a set of bits from the receiver portion of the transceiver and at least one of the bits in the set is replaced by the fixed bit pattern before being communicated to the transmitter portion of the receiver.

5 Claims, 1 Drawing Sheet

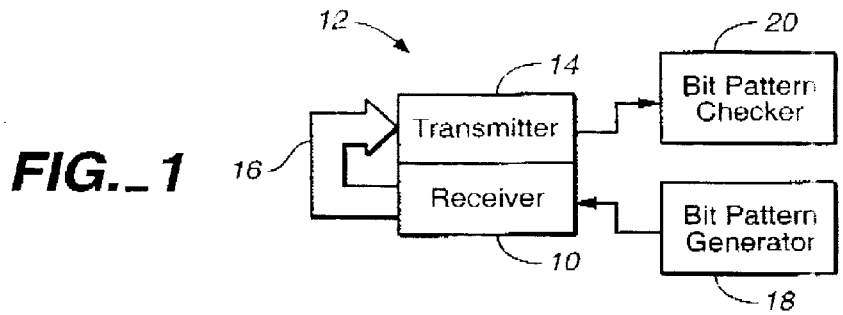
FIG._1
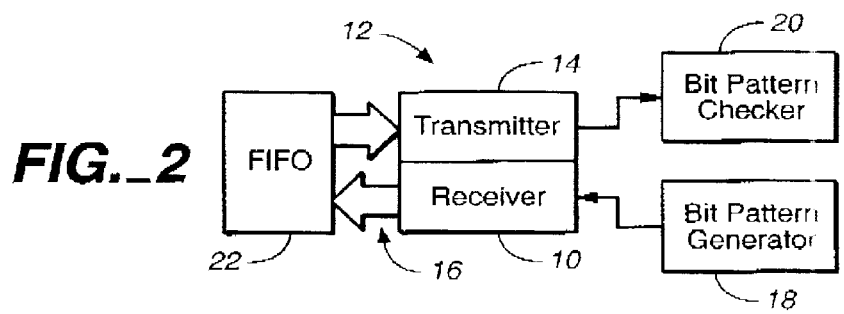
FIG._2
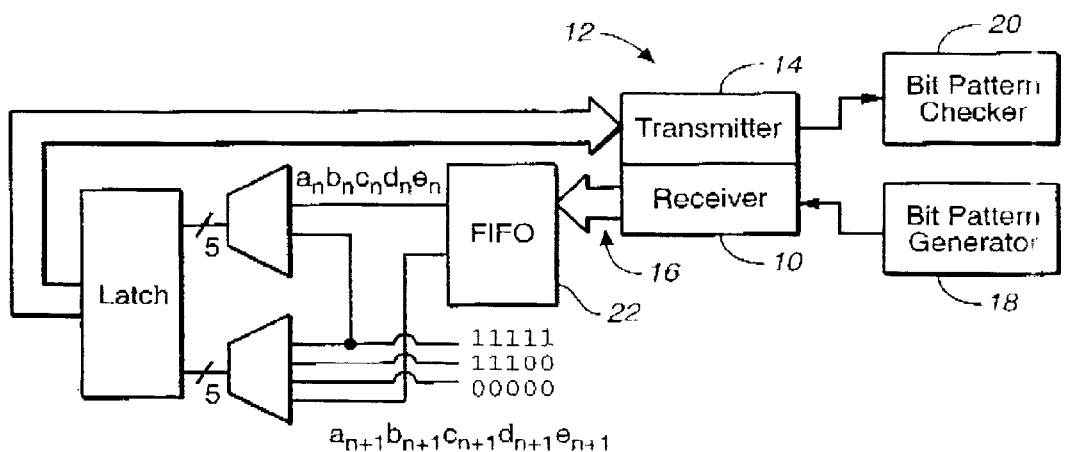
FIG._3

METHOD AND CIRCUIT FOR TESTING DEVICES WITH SERIAL DATA LINKS

BACKGROUND

The present invention relates generally to circuits and methods for testing devices, and relates more specifically to a circuit and method which can be used to test products with serial data links, such as transceivers, thereby improving the testability of these devices.

Some examples of devices or products which generally include serial data links include hard disk drives, printers, digital cameras, etc. Generally, a serial data link provides that a transceiver is located at each end of a serial cable. Each transceiver transmits and receives signals, and is connected to a controller through a parallel interface. The transmitter of each transceiver receives parallel data (i.e. data in a parallel data stream) from the respective controller to which that transceiver is connected, converts the data into a serial data stream, and then transmits the serial data into the cable and to the other transceiver. The receiver of the other transceiver receives the incoming serial data stream, recovers an embedded clock signal, re-times the data, does a serial-to-parallel conversion, and then sends the data to the other, respective controller (through the parallel interface).

In recent years, many serial link standards have been proposed to improve the input/output (I/O) performance of different computer systems. Some examples of serial link standards which have been proposed in recent years include the 1394, Fibre Channel and Gigabit Ethernet serial data link standards, as well as others.

When a device with a serial data link fails, generally there is no easy way to determine whether the failure was caused by the serial transceiver of the serial data link, or by other components in the device. For example, when data is to be written to a disk drive, the data is communicated to the disk drive through a 1394 serial data link, for example, and the data which is actually written to the disk is supposed to be identical to the data which was originally communicated to the disk drive through the 1394 serial data link. If the data actually written to the disk is inconsistent with the data which was originally communicated to the disk drive through the 1394 serial data link (i.e. there is corruption), it is generally relatively difficult to determine, without opening the cover of the disk drive and testing each individual component, if the inconsistency (i.e. failure) was caused by a transceiver which malfunctioned, or instead by some other component of the disk drive.

A transceiver can be tested in a factory before being incorporated into a finished product (e.g. into a hard disk drive, a printer, a digital camera, etc.). For example, bit error rate tests can be performed by generating a pre-determined bit pattern, communicating the bit pattern to a receiver of the transceiver, and then comparing the data received at the output of the receiver to the data which was fed to the input of the receiver.

However, once a transceiver is incorporated into the finished product, generally there is no easy way to test the transceiver. This is because the parallel interface of the transceiver is usually connected directly to a controller, as discussed above, and the transceiver is not accessible without opening the case. Consequently, should the finished product fail, it is generally relative difficult to determine whether the failure has occurred as a result of a transceiver which has malfunctioned.

A loopback function is sometimes used in association with a transceiver to perform some relatively basic self-test functions. The loopback function effectively loops back the signal at the serial data interface. In other words, the transmitter of the transceiver is connected to the receiver portion of the same transceiver (as opposed to that of another transceiver) through a serial cable. The usefulness of such a loopback is somewhat limited due to the fact that the quality of the signal, such as its amplitude, rise and fall time, jitter, etc., cannot be controlled to any great extent. Furthermore, this type of loopback does not provide that a bit error rate test, as described above, can be performed on a transceiver which is incorporated in a finished product.

SUMMARY AND OBJECTS

It is an object of the present invention to provide a circuit which makes it possible to test a transceiver which is incorporated in a finished product, such as in a hard disk drive, a printer, a digital camera, etc., without having to open or otherwise disassemble the product.

It is a further object of the present invention to provide a method which effectively improves the testability of products with serial data links.

Briefly, and in accordance with at least one of the foregoing objects, the present invention provides a circuit for testing a transceiver. The circuit includes a bit pattern generator connected to the transceiver such that the bit pattern generator can communicate a serial data stream to a receiver portion of the transceiver. The circuit also includes a bit pattern checker connected to the transceiver such that a transmitter portion of the transceiver can communicate a serial data stream to the bit pattern checker. The transceiver is configured such that the receiver portion of the transceiver is communicatingly looped back to the transmitter portion of the transceiver such that a data stream can be communicated from the receiver portion of the transceiver to the transmitter portion of the transceiver.

Desirably, the receiver portion of the transceiver is connected to the transmitter portion of the transceiver such that the receiver portion can communicate a parallel data stream to the transmitter portion of the transceiver, and a loopback circuit connected between the receiver portion of the transceiver and the transmitter portion of the transmitter portion of the receiver. The loopback circuit preferably includes a FIFO component configured for receiving the parallel data stream from the receiver portion of the transceiver, and includes fixed bit pattern means for communicating at least one fixed bit pattern to the transmitter portion of the transceiver. Specifically, preferably the loopback circuit is configured such that the FIFO component receives a set of bits from the receiver portion of the transceiver and at least one of the bits in the set is replaced by the fixed bit pattern before being communicated to the transmitter portion of the receiver. A first fixed bit pattern may be communicated to the transmitter portion of the transceiver when an underflow situation occurs in the FIFO component, and a second fixed bit pattern may be communicated to the transmitter portion of the transceiver when an overflow situation occurs in the FIFO component.

Such a method and configuration makes it possible to test a transceiver which is incorporated in a finished product, such as in a hard disk drive, a printer, a digital camera, etc., without having to open or otherwise disassemble the product.

BRIEF DESCRIPTION OF THE DRAWINGS

The present invention and the advantages thereof will become more apparent upon consideration of the following detailed description when taken in conjunction with the accompanying drawings of which:

FIG. 1 is a schematic diagram illustrating a loopback configuration which is in accordance with an embodiment of the present invention;

FIG. 2 is a schematic diagram illustrating a loopback configuration which includes a FIFO component, and which is in accordance with an embodiment of the present invention; and FIG. 3 is a schematic diagram illustrating a hardware implementation which is in accordance with a preferred embodiment of the present invention.

DESCRIPTION OF EMBODIMENTS OF THE INVENTION

Embodiments in accordance with the present invention include circuits and methods which can be used to determine whether a failure has been caused by a transceiver which has malfunctioned.

As discussed above, a loopback function is sometimes used in association with a transceiver to perform some relatively basic self-test functions, and the loopback function effectively loops back the signal at the serial data interface. The loopback configuration provides that the transmitter portion of the transceiver is connected to the receiver portion of the same transceiver through a serial cable. As discussed above, the usefulness of such a loopback is somewhat limited due to the fact that the quality of the signal cannot be controlled to any great extent. Additionally, this type of loopback configuration does not provide that a transceiver can be tested in a finished product without having to open the case of the product or otherwise disassemble the product.

In contrast, FIG. 1 illustrates a loopback configuration which is in accordance with an embodiment of the present invention and provides that a transceiver can be tested in a finished product without having to open the case of the product or otherwise disassemble the product. The loopback configuration provides that a receiver portion 10 of a transceiver 12 is looped back to a transmitter portion 14 of the transceiver 12 via a parallel interface 16. The loopback provides that a parallel data stream can be communicated from the receiver portion 10 of the transceiver 12 to the transmitter portion 14 of the transceiver 12. A bit pattern generator 18 is connected to the receiver portion 10 so that the bit pattern generator 18 can communicate a serial data stream thereto. Also, the transmitter portion 14 of the transceiver 12 is connected to a bit pattern checker 20, and this connection provides that the transmitter portion 14 can communicate a serial data stream to the bit pattern checker 20. Hence, the bit pattern generator 18 communicates a known bit pattern to the receiver portion 10 of the transceiver 12 in a serial data stream. Then, the receiver portion 10 of the transceiver 12 communicates the data in a parallel data stream to the transmitter portion 14 of the transceiver 12. Subsequently, the transmitter portion 14 of the transceiver 12 communicates the data to the bit pattern checker 20 in a serial data stream. The bit pattern checker 20 checks whether the data received from the transceiver 12 is consistent with the data which was originally sent to the transceiver 12.

As mentioned, the loopback configuration illustrated in FIG. 1 provides that a transceiver 12 can be tested in a finished product without having to open the case of the product or otherwise disassembling the product. Additionally, because the serial data stream is communicated to the transceiver 12 from an external source (i.e. from the bit pattern generator 18), more control can be exercised over the quality of the signal which is used for the test of the transceiver 12.

The configuration illustrated in FIG. 1 presents a difficulty which must be addressed. The difficulty stems from the fact that the clock signal recovered from the serial data stream which is received by the receiver portion 10 of the transceiver 12 has a slightly different frequency than the local clock which is used by the transmitter portion 14 of the transceiver 12. In other words, the transmitter and receiver portions 14 and 10, respectively, of the transceiver 12 operate in different clock domains. Although the frequency difference between the clock signals should be relatively small (i.e. less than 200 ppm in most serial link standards), the difference must still be addressed. Otherwise, bits will be dropped or erroneously added to the looped back signal every once in a while. For example, if the data is received at 1.0001 Gbaud, but is transmitted at 0.9999 Gbaud, a data bit will be dropped every 5000 bits.

One solution to this problem is to utilize a FIFO (first-in, first-out) component 22 at the clock boundary, i.e. between the receiver 10 and the transmitter 14 in the parallel loopback 16, and this configuration is illustrated in FIG. 2. However, the size of the FIFO component 22 which is required depends on the length of the data that will be received by the component 22. Therefore, if a bit error rate test (which may require thousands of billions of bits to be received and transmitted) is going to be performed with the configuration illustrated in FIG. 2, the size of the FIFO component 22 required will be prohibitively large.

To reduce the size of the FIFO component 22 which is required in the configuration illustrated in FIG. 2, it is possible to add idle signals to the serial data stream which is communicated to the receiver portion 10 of the transceiver 12 by the bit pattern generator 18. Upon detection of the idle signals, the transceiver 12 can be configured to reset the FIFO component 22 so that the FIFO component 22 will never underflow or overflow. However, there are some drawbacks to this approach, such as:

1) At higher speeds, it can become difficult to reset the FIFO component 22 of the configuration illustrated in FIG. 2, during data transfer, without interrupting the normal data flow;

2) Because different serial data link standards will demand different idle signals, this makes the loopback implementation, which is illustrated in FIG. 2, as well as the test equipment, standard-dependent;

3) The intended data stream will have to be broken into smaller pieces separated by the idle signals, and this may effect the test results; and 4) If bit errors occur during the reception of idle signals, this will lead to the underflow or overflow of the FIFO component 22 because the FIFO component 22 will not be able to be reset correctly.

One method which could be implemented which avoids the aforementioned problems while keeping the size of the FIFO component 22 reasonable is to have the transmitter portion 14 of the transceiver 12 transmit to the bit pattern checker 20 only half of the bits it receives from the receiver portion 10 of the transceiver 12 through the parallel loopback interface 16. To eventually have all the data bits communicated to the bit pattern checker 20, the same data would need to be sent twice. Since half the bits are dropped intentionally, the space left in the byte as a result of dropping the bits can be used to adjust the data flow to avoid underflow or overflow of the FIFO component 22.

The following specifically describes such a method. The configuration illustrated in FIG. 3 is one possible hardware implementation which can be used in connection with such a method. While the method will be described with reference to the hardware implementation illustrated in FIG. 3, it should be understood that the method described can be implemented with other hardware configurations. For example, the method is going to be described with the assumption that the parallel interface is ten bits wide, and the hardware implementation illustrated in FIG. 3 is consistent with such a parallel interface. However, this is not necessarily the case, and other configurations and methods are possible without departing from the scope of the present invention.

As mentioned, the method is going to be described with the assumption that the parallel interface is ten bits wide. In this case, the following bit string is desired to be communicated to the receiver portion 10 of the transceiver 12:

$a_1 b_1 c_1 d_1 e_1 f_1 g_1 h_1 i_1 j_1 a_2 b_2 c_2 d_2 e_2 f_2 g_2 h_2 i_2 j_2 a_3 b_3 c_3 d_3 e_3 f_3 g_3 h_3 i_3 j_3 \ldots$ where $a_1$ is the first bit of the first byte to be sent to the receiver 10, $b_1$ is the second bit of the first byte to be sent to the receiver 10, and so on.

At the output of the receiver portion 10 of the transceiver 12, the serial data will be converted into parallel before being sent to the FIFO component 22 in a parallel data stream as follows:

$a_1 b_1 c_1 d_1 e_1 f_1 g_1 h_1 i_1 j_1$ $a_2 b_2 c_2 d_2 e_2 f_2 g_2 h_2 i_2 j_2$ $a_3 b_3 c_3 d_3 e_3 f_3 g_3 h_3 i_3 j_3$

.

.

.

When the FIFO component 22 communicates the data to the transmitter portion 14 of the transceiver 12, preferably half the bits are replaced by a fixed bit pattern. The configuration illustrated in FIG. 3 assumes that the following three fixed bit patterns will be utilized depending on the situation: 00000, 11111 and 11100, and this will be described in detail. Of course, other fixed bit patterns can be used without departing from the scope of the present invention.

If half of the bits communicated by the FIFO component 22 to the transmitter portion 14 of the transceiver 12 are replaced by the fixed bit pattern 00000, the bit patterns received by transmitter portion 14 of the transceiver 12 will be as follows:

$a_1 b_1 c_1 d_1 e_1 00000$ $a_2 b_2 c_2 d_2 e_2 00000$ $a_3 b_3 c_3 d_3 e_3 00000$

.

.

.

The portion of the byte which has been replaced with the fixed bit pattern 00000 can be used to handle underflow or overflow situations of the FIFO component 22. For example, in the case where the clock speed of the transmitter portion 14 of the transceiver 12 is slower than the clock signal which is received, the FIFO component 22 will overflow. To avoid this, the bit patterns at the output of the FIFO component 22 can be adjusted from:

.

.

.

$a_n b_n c_n d_n e_n 00000$ $a_{n+1} b_{n+1} c_{n+1} d_{n+1} e_{n+1} 00000$ $a_{n+2} b_{n+2} c_{n+2} d_{n+2} e_{n+2} 00000$

.

.

.

to

.

.

.

$a_n b_n c_n d_n e_n 11111$ $a_{n+1} b_{n+1} c_{n+1} d_{n+1} e_{n+1} a_{n+2} b_{n+2} c_{n+2} d_{n+2} e_{n+2}$ $a_{n+3} b_{n+3} c_{n+3} d_{n+3} e_{n+3} 00000$

.

.

.

when the FIFO component 22 signals that it is almost full. This effectively removes one byte from the data flow without losing any data. The 11111 fixed bit pattern in byte n, above, is used to indicate that byte n+1 will have the 00000 fixed bit pattern replaced by the data bits from byte n+2.

Likewise, in the case where the clock speed of the transmitter portion 14 of the transceiver 12 is faster than the received clock, the FIFO component 22 will underflow. An underflow condition can be avoided by adjusting the normal bit pattern at the output of the FIFO component 22 from

.

.

.

$a_n b_n c_n d_n e_n 00000$ $a_{n+1} b_{n+1} c_{n+1} d_{n+1} e_{n+1} 00000$ $a_{n+2} b_{n+2} c_{n+2} d_{n+2} e_{n+2} 00000$

.

to, for example,

.
.
.

$a_n b_n c_n d_n e_n 11100$

1111100000

$a_{n+1} b_{n+1} c_{n+1} d_{n+1} e_{n+1} 00000$ $a_{n+2} b_{n+2} c_{n+2} d_{n+2} e_{n+2} 00000$

.
.
.

when the FIFO component 22 signals that it is almost empty. The 11100 fixed bit pattern in byte n is used to indicate that the subsequent byte is a "padding" byte which can be discarded.

Since half of the data bytes are replaced by a fixed bit pattern, for example by the bit pattern 00000, the same data string will need to be transmitted twice so that no data is lost. When the data is communicated to the receiver portion 10 of the transceiver 12 for the second time, the bits will need to be shifted by five bits so that the other half (i.e. the first half) of the bits will be replaced by the fixed bit pattern, for example by the bit pattern 00000, as follows:

$p_1 p_2 p_3 p_4 p_5 a_1 b_1 c_1 d_1 e_1 f_1 g_1 h_1 i_1 j_1 a_2 b_2 c_2 d_2 e_2 f_2 g_2 h_2 i_2 j_2 a_3 b_3 c_3 d_3 e_3 f_3 h_3 i_3 j_3$
...

where $p_1$ to $p_5$ are padding bits.

The method described can be employed to determine whether a failure was caused by a transceiver. The same method can also be used by manufacturers to do final tests on products before the products are shipped. Still further, the method can be used to do compatibility testing on devices from different vendors.

As discussed, the hardware configuration illustrated in FIG. 3 is one possible implementation which can be used in connection with the method described, and the method and hardware configuration have been described and depicted, respectively, with the assumption that the parallel interface is ten bits wide. However, this is not necessarily the case. Regardless, other configurations and methods are possible without departing from the scope of the present invention.

What is claimed is:

1. A configuration for testing a device, said configuration comprising:
    a bit pattern generator serially linked to the device for communicating data in a first serial data stream to the device;
    a loopback circuit connected to the device, wherein said loopback circuit receives said data in a parallel data stream, wherein said loopback circuit is configured to communicate fixed bit patterns mixed with said parallel data stream to said device; and
    a bit pattern checker serially linked to the device for receiving in a second serial data stream, said fixed bit patterns mixed with said parallel data stream, wherein said loopback circuit is configured to prevent the parallel data stream from being adversely affected by other devices, wherein the configuration tests the device and only the device.

2. A circuit for testing serial-to-parallel and parallel-to-serial data conversion performance of a transceiver, said circuit comprising:
    a bit pattern generator connected to a serial data interface of a receiver portion of the transceiver such that said bit pattern generator can communicate a serial data stream to the receiver portion of the transceiver; and
    a bit pattern checker connected to a serial data interface of a transmitter portion of the transceiver such that the transmitter portion of the transceiver can communicate a serial data stream to said hit pattern checker, wherein the transceiver is configured such that a parallel data interface of the receiver portion of the transceiver is communicatingly looped directly back to a parallel data interface of the transmitter portion of the transceiver such that a parallel data stream can be communicated from the receiver portion of the transceiver directly to the transmitter portion of the transceiver without the parallel data stream being adversely affected by other devices, wherein the circuit tests the transceiver and only the transceiver, wherein the parallel data interface of the receiver portion of the transceiver is directly connected to the parallel data interface of the transmitter portion of the transceiver such that the receiver portion can communicate the parallel data stream directly to the transmitter portion of the transceiver, further comprising a loopback circuit connected between the parallel data interface of the receiver portion of the transceiver and the parallel data interface of the transmitter portion of the receiver, said loopback circuit comprising a FIFO component configured for receiving the parallel data stream from the receiver portion of the transceiver, said loopback circuit further comprising fixed bit pattern means for communicating at least one fixed bit pattern to the transmitter portion of the transceiver, said loopback circuit configured such that said FIFO component receives a set of bits from the receiver portion of the transceiver and at least one of the bits in the set is replaced by said fixed bit pattern before being communicated to the transmitter portion of the receiver.

3. A circuit for testing serial-to-parallel and parallel-to-serial data conversion performance of a transceiver, said circuit comprising:
    a bit pattern generator connected to a serial data interface of a receiver portion of the transceiver such that said bit pattern generator can communicate a serial data stream to the receiver portion of the transceiver; and
    a bit pattern checker connected to a serial data interface of a transmitter portion of the transceiver such that the transmitter portion of the transceiver can communicate a serial data stream to said bit pattern checker, wherein the transceiver is configured such that a parallel data interface of the receiver portion of the transceiver is communicatingly looped directly back to a parallel data interface of the transmitter portion of the transceiver such that a parallel data stream can be communicated from the receiver portion of the transceiver directly to the transmitter portion of the transceiver without the parallel data stream being adversely affected by other devices, wherein the circuit tests the transceiver and only the transceiver, wherein the parallel data interface of the receiver portion of the transceiver is directly connected to the parallel data interface of the transmitter portion of the transceiver such that the receiver portion can communicate the parallel data stream directly to the transmitter portion of the transceiver, further comprising a loopback circuit connected between the parallel data interface of the receiver portion of the transceiver and the parallel data interface of the transmitter portion of the receiver, said loopback circuit comprising a FIFO component configured for receiving the parallel data stream from the receiver portion of the transceiver, said loopback circuit further comprising fixed bit pattern means for communicating at least one fixed bit pattern to the transmitter portion of the transceiver, wherein said at least one fixed bit pattern includes a first fixed bit pattern which is communicated to the transmitter portion of the transceiver when an underflow situation occurs in said FIFO component and a second fixed bit pattern which is communicated to the transmitter portion of the transceiver when an overflow situation occurs in said FIFO component.

4. A circuit for testing serial-to-parallel and parallel-to-serial data conversion performance of a transceiver, said circuit comprising:

a bit pattern generator connected to a serial data interface of a receiver portion of the transceiver such that said bit pattern generator can communicate a serial data stream to the receiver portion of the transceiver; and a bit pattern checker connected to a serial data interface of a transmitter portion of the transceiver such that the transmitter portion of the transceiver can communicate a serial data stream to said bit pattern checker, wherein the transceiver is configured such that a parallel data interface of the receiver portion of the transceiver is communicatingly looped directly back to a parallel data interface of the transmitter portion of the transceiver such that a parallel data stream can be communicated from the receiver portion of the transceiver directly to the transmitter portion of the transceiver without the parallel data stream being adversely affected by other devices, wherein the circuit tests the transceiver and only the transceiver, further comprising a loopback circuit connected between the parallel data interface of the receiver portion of the transceiver and the parallel data interface of the transmitter portion of the receiver, said loopback circuit comprising a FIFO component configured for receiving the parallel data stream from the receiver portion of the transceiver, said loopback circuit further comprising fixed bit pattern means for communicating at least one fixed bit pattern to the transmitter portion of the transceiver, said loopback circuit configured such that said FIFO component receives a set of bits from the receiver portion of the transceiver and at least one of the bits in the set is replaced by said fixed bit pattern before being communicated to the transmitter portion of the receiver.

5. A circuit for testing serial-to-parallel and parallel-to-serial data conversion performance of a transceiver, said circuit comprising:

a bit pattern generator connected to a serial data interface of a receiver portion of the transceiver such that said bit pattern generator can communicate a serial data stream to the receiver portion of the transceiver; and a bit pattern checker connected to a serial data interface of a transmitter portion of the transceiver such that the transmitter portion of the transceiver can communicate a serial data stream to said bit pattern checker, wherein the transceiver is configured such that a parallel data interface of the receiver portion of the transceiver is communicatingly looped directly back to a parallel data interface of the transmitter portion of the transceiver such that a parallel data stream can be communicated from the receiver portion of the transceiver directly to the transmitter portion of the transceiver without the parallel data stream being adversely affected by other devices, wherein the circuit tests the transceiver and only the transceiver, said loopback circuit comprising a FIFO component configured for receiving the parallel data stream from the receiver portion of the transceiver, said loopback circuit further comprising fixed bit pattern means for communicating at least one fixed bit pattern to the transmitter portion of the transceiver, wherein said at least one fixed bit pattern includes a first fixed bit pattern which is communicated to the transmitter portion of the transceiver when an underflow situation occurs in said FIFO component and a second fixed bit pattern which is communicated to the transmitter portion of the transceiver when an overflow situation occurs in said FIFO component.

\* \* \* \* \*